(No Model.)
C. EVERTS.
ICE CREAM FREEZER.
No. 577,733. Patented Feb. 23, 1897.
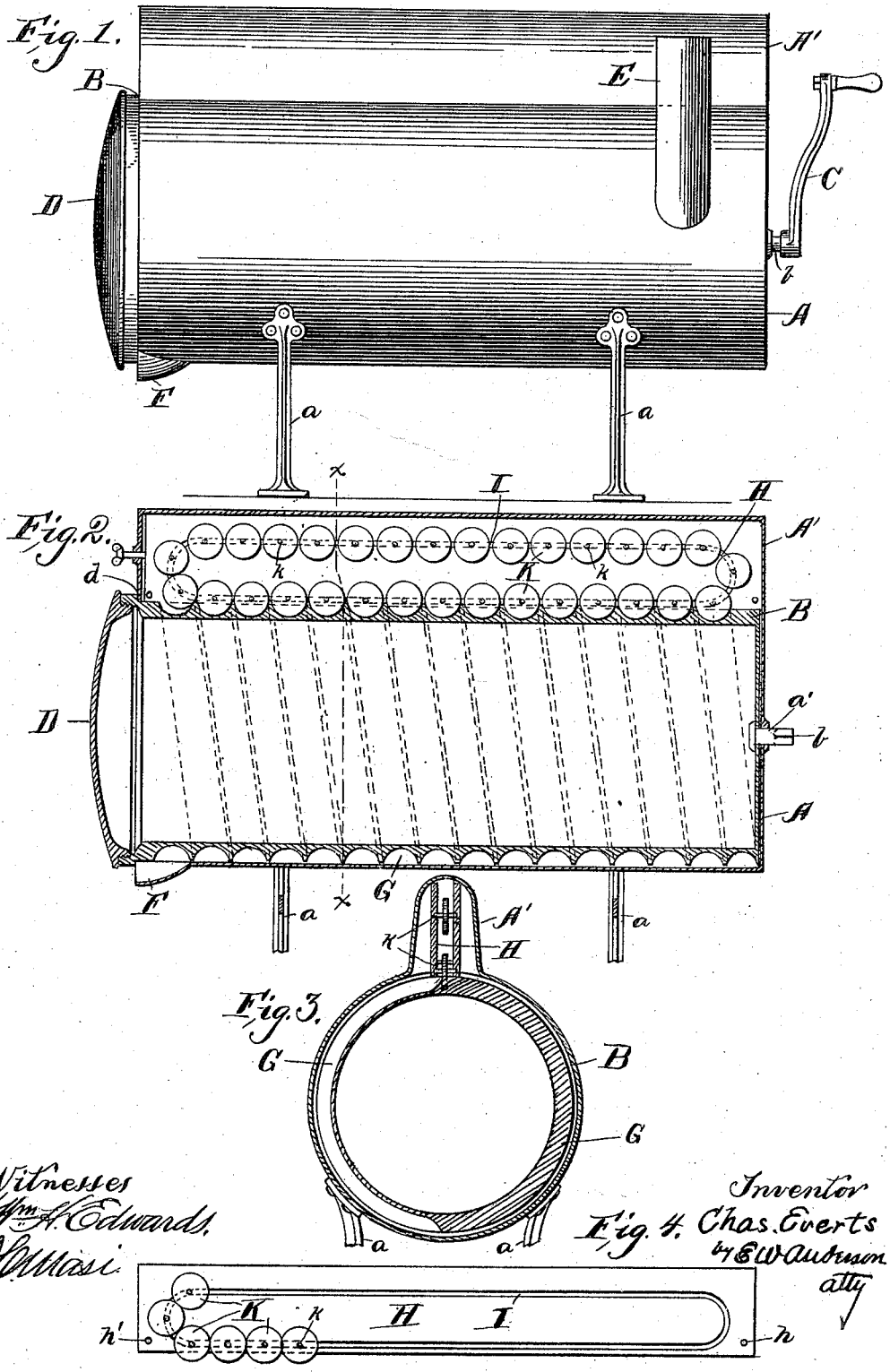

UNITED STATES PATENT OFFICE.

CHARLES EVERTS, OF OMAHA, NEBRASKA.

ICE-CREAM FREEZER.

SPECIFICATION forming part of Letters Patent No. 577,733, dated February 23, 1897.

Application filed August 6, 1896. Serial No. 601,877. (No model.)

*To all whom it may concern:*

Be it known that I, CHARLES EVERTS, a citizen of the United States, and a resident of Omaha, in the county of Douglas and State of Nebraska, have invented certain new and useful Improvements in Ice-Cream Freezers; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1 of the drawings is a side elevation of my improved ice-cream freezer. Fig. 2 is a vertical longitudinal section of same. Fig. 3 is a vertical section of same on line $x\,x$, Fig. 2; and Fig. 4 is a detail view of the plate H, showing some of the rollers in place.

This invention is designed to provide an ice-cream freezer of improved character; and it consists in the novel construction and combination of parts, all substantially as hereinafter described, and pointed out in the appended claims.

Referring to the accompanying drawings, the letter A designates a cylindrical hollow shell or casing which is supported in horizontal position by means of legs $a$ or other suitable means. Said shell or casing, which will hereinafter be termed the "outer" cylinder, is open at one end and closed at the other, except for a small central opening $a'$. At the top it has a hollow longitudinal vertical extension A', which is preferably of the form of an inverted U or V, its chamber being in communication with that of the body of the cylinder.

B designates an inner cylinder whose diameter is somewhat less than that of the outer cylinder within which it is placed, the difference being sufficient to permit the necessary clearance and the introduction of a thin layer of cream. One end of said inner cylinder is closed and is formed with a journal-stud $b$, which extends through the opening $a$ before referred to and is fitted to receive a crank C. The opposite end of the inner cylinder is closed in operation by a removable head or plug D, which is secured in place by screw-threads or by other suitable fastening devices. This inner cylinder is, as shown, somewhat longer than the outer one and is formed at its outer projecting end portion with a surrounding shoulder $d$, against which the adjacent end of the outer cylinder abuts, thereby providing a bearing for the inner cylinder.

E designates a lateral filling-opening in the outer cylinder near its closed end, and F is the discharge for the frozen cream, said discharge being made by flaring downwardly the lower edge portion of the said cylinder at its open end to form a lip.

The surface of the inner cylinder is formed with a deep helical groove G of slow pitch, which is of broad semicylindrical form and which extends continuously from the inner end to a point near the shoulder $d$, where it terminates.

Placed in the chamber of the extension A', above described, are two parallel edgewise-disposed plates or strips H, which are shown as provided with interfitting pins and sockets. $h\,h'$ are set-screws which further hold the plates in place. These plates or strips are spaced from each other a short distance and each is formed on its inner face with an endless oblong groove I of narrow form.

K designates a series of small wheels or disks having laterally-projected journals $k$, which are designed to engage the grooves I when the wheels or disks are placed between the two plates or strips H, as shown in Fig. 4. These wheels or disks are of such diameter that the lower series or those in the lower portions of the grooves I project into engagement with the helical groove of the inner cylinder, whereby as the latter is rotated it acts upon them in the manner of a worm and gives them a rotary and forward movement around in the said grooves I. The purpose of these wheels or disks is to act as clearers to prevent the frozen cream from accumulating to such an extent as to clog the operation of the inner cylinder, especially when the operator ceases turning for a short interval.

The operation is as follows: The inner cylinder is filled with crushed ice and salt or other refrigerant, either with said cylinder in place or removed, after which the removable plug or head is fastened therein. If the said cylinder is removed for filling, it is then pushed back inside the outer cylinder, the wheels or disks K taking the groove G. The freezer is then preferably allowed to stand while the cream is prepared in order that it may become thoroughly cold. The cream is then poured in through the opening E by means of a suitable funnel. After a few turns of the crank, delivery of the frozen cream commences. Owing to the slow pitch of the groove G, there is very little friction on the wheels or disks K.

I prefer that the entire freezer shall be made of metal with the exception of the handle of the crank.

The above-described freezer possesses the following advantages over the ordinary tub-freezers:

First. It has no wooden tub to dry up and fall to pieces.

Second. It uses much less ice to freeze the same quantity of cream.

Third. Different kinds of cream may be frozen with the same packing by simply changing the kind of cream which is poured in.

Fourth. That it freezes all kinds of cream equally well and is cleaner and more easily taken care of.

Having thus described my invention, what I claim as new, and desire to secure by Letters Patent, is—

1. An ice-cream freezer, having an outer cylinder open at one end and closed at the other, an inner freezing and refrigerant-containing cylinder adapted to be contained and rotated within the outer cylinder, said inner cylinder having at one end a journal-stud and crank-seat which extend through an opening in the closed end of the outer cylinder, and at its opposite projecting end portion an external surrounding shoulder against which the open end of the outer cylinder bears, and a detachable head or plug for closing the outer end of the inner cylinder, said outer cylinder having a filling-opening and a discharge, and the inner cylinder a helically-grooved surface, together with clearing devices which engage the said grooved surface substantially as specified.

2. In an ice-cream freezer, the combination with an outer cylinder-casing having a longitudinal vertical hollow extension at its upper portion, said cylinder being open at one end and closed at the other, and provided with a filling-opening near its closed end, and with a discharge at its open end, of an inner freezing-cylinder supported to rotate within the outer cylinder, and having a helically-grooved exterior surface, and clearing devices working in the extension of the outer casing and engaging the said grooved surface, substantially as specified.

3. In an ice-cream freezer, the combination with an outer cylindrical shell or casing having a hollow vertical longitudinal extension at its upper portion provided therein with endless ways or tracks, of the inner removable freezing-cylinder journaled to rotate within the outer cylinder and having a continuous helical groove extending around its outer surface, together with a series of wheels or disks arranged to run in said ways or tracks and to engage the said groove, substantially as specified.

4. In an ice-cream freezer, the combination of an outer stationary cylinder or case having a filling and a discharge opening, an inner rotary refrigerant-containing cylinder having a helical groove in its surface, and a series of movable wheels or disks arranged to engage said groove, substantially as specified.

In testimony whereof I affix my signature in presence of two witnesses.

CHARLES EVERTS.

Witnesses:
E. E. ZIMMERMAN,
W. L. DAVIES.